(12) United States Patent
Ohno et al.

(10) Patent No.: US 11,376,915 B2
(45) Date of Patent: Jul. 5, 2022

(54) ELECTRICALLY POWERED SUSPENSION SYSTEM

(71) Applicant: HONDA MOTOR CO., LTD., Tokyo (JP)

(72) Inventors: Satoshi Ohno, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 351 days.

(21) Appl. No.: 16/830,477

(22) Filed: Mar. 26, 2020

(65) Prior Publication Data
US 2020/0307339 A1 Oct. 1, 2020

(51) Int. Cl.
*B60G 17/015* (2006.01)
*B60G 17/0165* (2006.01)
(Continued)

(52) U.S. Cl.
CPC ....... *B60G 17/0157* (2013.01); *B60G 17/018* (2013.01); *B60G 17/0162* (2013.01);
(Continued)

(58) Field of Classification Search
CPC ............ B60G 17/0157; B60G 17/0162; B60G 17/0165; B60G 17/018; B60G 2202/42;
(Continued)

(56) References Cited

U.S. PATENT DOCUMENTS 5,539,640 A * 7/1996 Kishimoto ......... B60G 17/0165
701/40
8,818,630 B2 * 8/2014 Kobayashi ............ B60W 10/04
340/440
(Continued)

FOREIGN PATENT DOCUMENTS

JP 2010-132222 A 6/2010
JP 2017-165282 A 9/2017
(Continued)

OTHER PUBLICATIONS

Office Action received in corresponding Japanese application No. 2019-061140 dated Oct. 27, 2020 with English translation (6 pages).

*Primary Examiner* — Toan C To
(74) *Attorney, Agent, or Firm* — Rankin, Hill & Clark LLP

(57) ABSTRACT

Included are an electromagnetic actuator which generates a drive force for damping vibration of a vehicle body; an information acquirer which acquires time-series information about a stroke position of, and information about a stroke velocity of, the electromagnetic actuator, as well as information about reverse of a stroke direction and information about a stroke amount after the reverse; a damping force calculator which calculates a target damping force based on the information about the stroke velocity; and a drive controller which controls drive of the electromagnetic actuator using a target drive force based on the target damping force calculated by the damping force calculator. The damping force calculator corrects the target drive force based on the information about the stroke amount after the reverse acquired by the information acquirer.

7 Claims, 12 Drawing Sheets

(51) Int. Cl.
*B60G 17/016* (2006.01)
*B60G 17/018* (2006.01)

(52) U.S. Cl.
CPC ...... *B60G 17/0165* (2013.01); *B60G 2202/42* (2013.01); *B60G 2400/102* (2013.01); *B60G 2400/204* (2013.01); *B60G 2400/252* (2013.01); *B60G 2400/41* (2013.01)

(58) Field of Classification Search
CPC ........ B60G 2400/102; B60G 2400/204; B60G 2400/252; B60G 2400/41
USPC .......................................... 280/5.515; 701/37
See application file for complete search history.

(56) References Cited

U.S. PATENT DOCUMENTS

| | | | | |
|---|---|---|---|---|
| 11,186,134 | B2* | 11/2021 | Ohno | B60G 17/06 |
| 2004/0154886 | A1* | 8/2004 | Hio | B60G 17/0157 |
| | | | | 188/266 |
| 2007/0029711 | A1* | 2/2007 | Ehara | B60G 17/08 |
| | | | | 267/64.28 |
| 2011/0025000 | A1* | 2/2011 | Inoue | B60G 17/06 |
| | | | | 280/5.507 |
| 2011/0241299 | A1* | 10/2011 | Harada | B60G 17/08 |
| | | | | 280/5.513 |
| 2015/0224845 | A1* | 8/2015 | Anderson | B60G 17/052 |
| | | | | 701/37 |
| 2015/0367702 | A1* | 12/2015 | Kubota | B60G 17/0165 |
| | | | | 701/37 |
| 2018/0134111 | A1 | 5/2018 | Toyohira et al. | |
| 2018/0297434 | A1* | 10/2018 | Ohno | B60G 17/02 |
| 2018/0361813 | A1 | 12/2018 | Ohno et al. | |
| 2018/0361814 | A1* | 12/2018 | Ohno | B60G 17/0152 |
| 2018/0361816 | A1* | 12/2018 | Ohno | B60G 17/0165 |
| 2019/0366791 | A1* | 12/2019 | Toyohira | B60G 17/0157 |
| 2020/0324603 | A1* | 10/2020 | Ohno | B60G 17/08 |
| 2020/0324605 | A1* | 10/2020 | Ohno | B60G 17/06 |
| 2020/0333316 | A1* | 10/2020 | Ohno | B60G 17/0165 |
| 2021/0031585 | A1* | 2/2021 | Toyohira | B60G 17/01941 |

FOREIGN PATENT DOCUMENTS

| | | |
|---|---|---|
| JP | 2018-177050 A | 11/2018 |
| JP | 2019-001368 A | 1/2019 |
| JP | 2019-001370 A | 1/2019 |

* cited by examiner

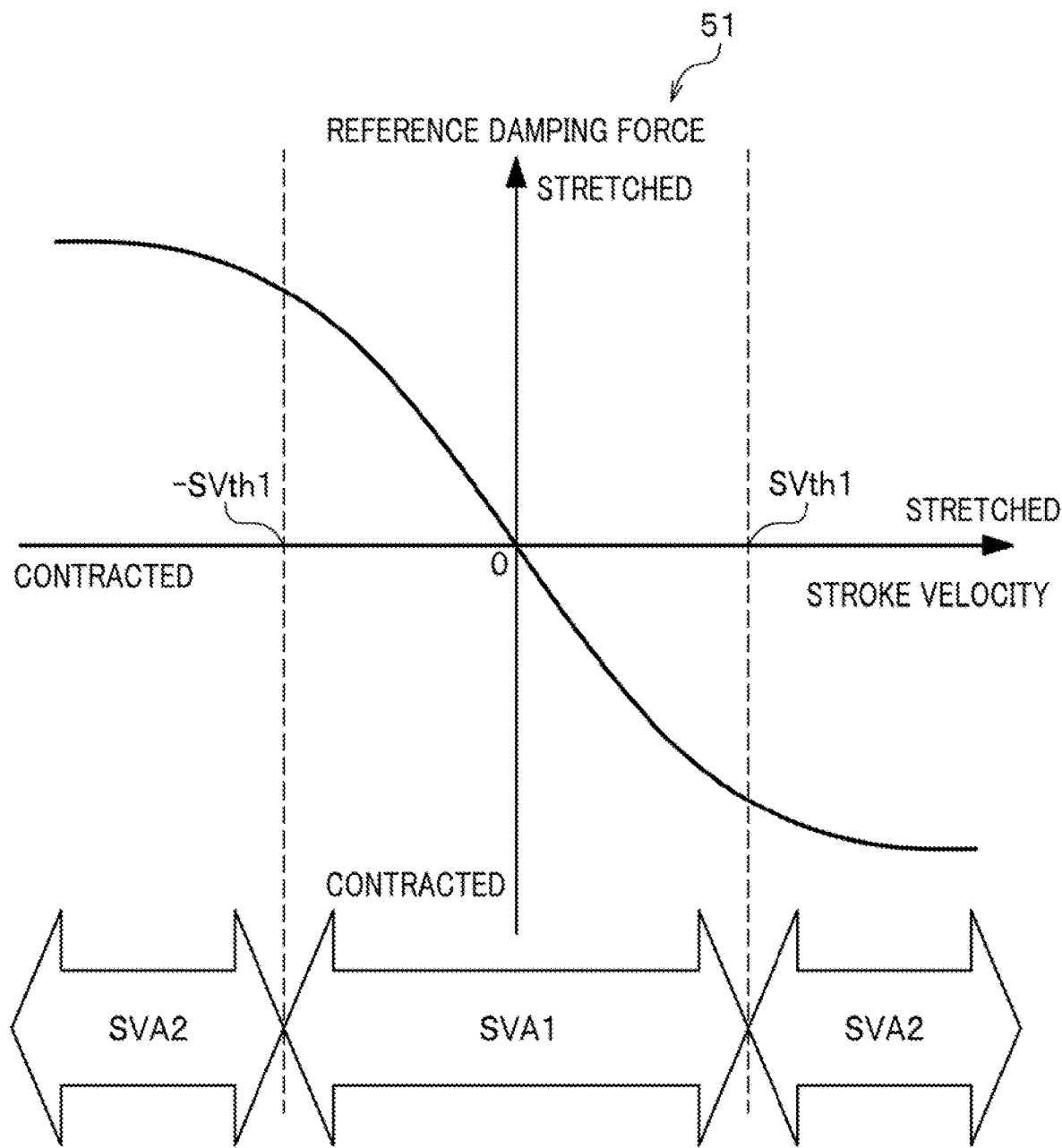

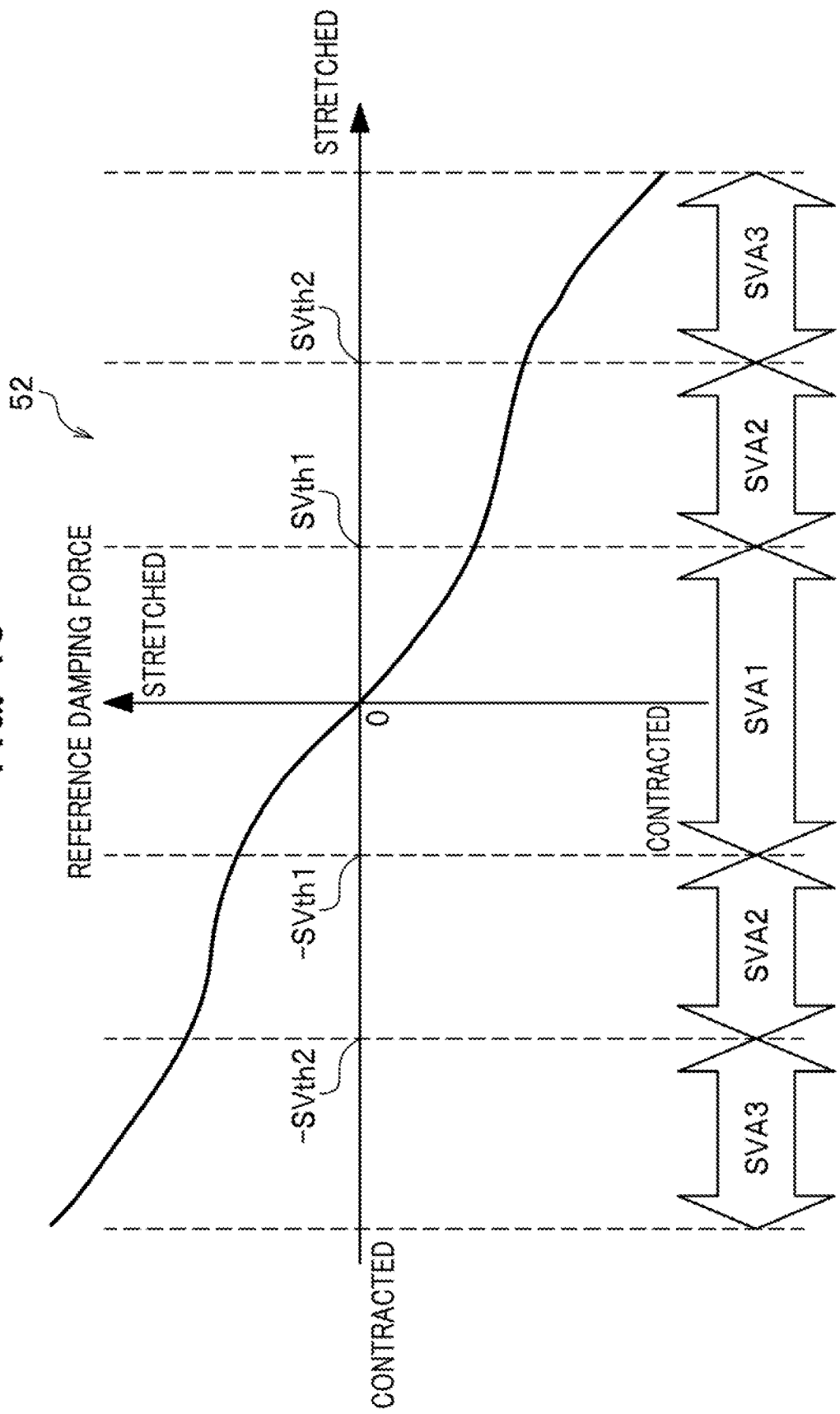

ELECTRICALLY POWERED SUSPENSION SYSTEM

CROSS-REFERENCE TO RELATED APPLICATION

This application is based upon and claims priority from the Japanese Patent Application No. 2019-61140, filed on Mar. 27, 2019, the entire contents of which are incorporated herein by reference.

BACKGROUND OF THE INVENTION

1. Field of the Invention

The present invention relates to an electrically powered suspension system including an electromagnetic actuator provided between a vehicle body and a wheel of a vehicle and configured to generate drive force for damping vibration of the vehicle.

2. Description of the Related Art

An electrically powered suspension system has been known which includes an electromagnetic actuator provided between a vehicle body and a wheel of a vehicle, and configured to generate a drive force for damping vibration of the vehicle using an electric motor (see, for example, Japanese Patent Application Publication No. 2010-132222, hereinafter referred to as "Patent Document 1"). The electromagnetic actuator includes the electric motor and a ball screw mechanism. The electromagnetic actuator operates to generate the drive force for damping the vibration of the vehicle body by converting the rotary motion of the electric motor into the linear motion of the ball screw mechanism.

The electrically powered suspension system disclosed in Patent Document 1 includes a velocity-damping force map which defines a correspondence relationship between the stroke velocity and the damping force of the electromagnetic actuator. The electrically powered suspension system is designed to enhance the ride quality of the vehicle by: calculating the stroke velocity of the electromagnetic actuator, and a reference damping force (a target damping force) corresponding to the stroke velocity based on the velocity-damping force map; and controlling drive of the electromagnetic actuator based on the calculated target damping force and the like.

SUMMARY OF THE INVENTION

The electrically powered suspension system disclosed in Patent Document 1 needs to acquire a vibration isolation performance of sprung members such as a strut tower part on the vehicle-body side, and a grounding performance of unsprung members such as a lower arm and a knuckle on the wheel side.

Emphasis on driving stability by enhancing the target damping force over the reference damping force, however, lowers the vibration isolation performance of the sprung members, and accordingly impairs the ride quality of the vehicle. Emphasis on the ride quality by lowering the target damping force under the reference damping force, on the other hand, lowers the grounding performance of the unsprung members, and accordingly impairs the driving stability of the vehicle.

In short, there is a trade-off relationship between the vibration isolation performance of the sprung members and the grounding performance of the unsprung members. This poses a problem that the two performances are difficult to fulfill at the same time at a higher level corresponding to the motion condition of the vehicle which changes with time.

The present invention has been made with the above situation taken into consideration. An object of the present invention is to provide an electrically powered suspension system which is capable of fulfilling the vibration isolation performance of the sprung members and the grounding performance of the unsprung members at the same time at a higher level corresponding to the motion condition of the vehicle which changes with time.

For the purpose of achieving the above object, the invention based on a first aspect has a major feature as follows. The invention includes: an electromagnetic actuator which is provided between a vehicle body and a wheel of a vehicle, and which generates a drive force for damping vibration of the vehicle; an information acquirer which acquires time-series information about a stroke position of, and information about a stroke velocity of, the electromagnetic actuator, as well as information about reverse of a stroke direction and information about a stroke amount after the reverse, based on the time-series information about the stroke position; a damping force calculator which calculates a target damping force serving as a target value of a damping operation of the electromagnetic actuator based on the information about a stroke velocity acquired by the information acquirer; and a drive controller which controls drive of the electromagnetic actuator using a target drive force based on the target damping force calculated by the damping force calculator. The damping force calculator corrects the target drive force based on the information about the stroke amount after the reverse acquired by the information acquirer.

The present invention makes it possible to fulfill the vibration isolation performance of the sprung members and the grounding performance of the unsprung members at the same at a higher level corresponding to the motion condition of the vehicle which changes with time.

BRIEF DESCRIPTION OF THE DRAWINGS

FIG. 4B is an explanatory diagram of a reference damping force map according to an example, which illustrates a relationship between a stroke velocity and a corresponding reference damping force.

FIG. 4C is an explanatory diagram of a reference damping force map according to a modification.

DETAILED DESCRIPTION OF THE EMBODIMENTS

An electrically powered suspension system according to an embodiment of the present invention will be hereinafter described in detail with reference to the accompanying drawings depending on the necessity.

It should be noted that in the following diagrams, members having common functions will be denoted by common reference signs. In addition, sizes and shapes of members are schematically illustrated with deformation or exaggeration for the sake of explanatory convenience.

[A Basic Configuration Common Among of Electrically Powered Suspension Systems 11 According to Embodiments of the Present Invention]

Figure 1:
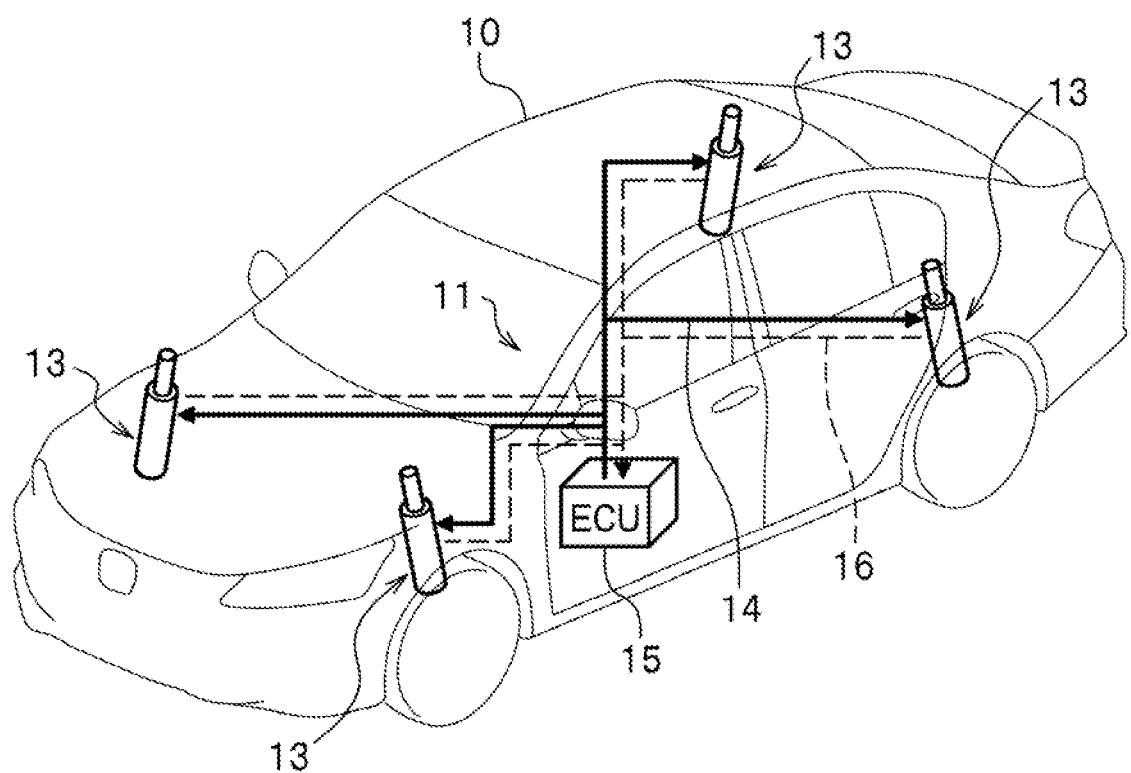
FIG. 1 is an overall configuration diagram of an electrically powered suspension system according to an embodiment of the present invention.
Figure 2:
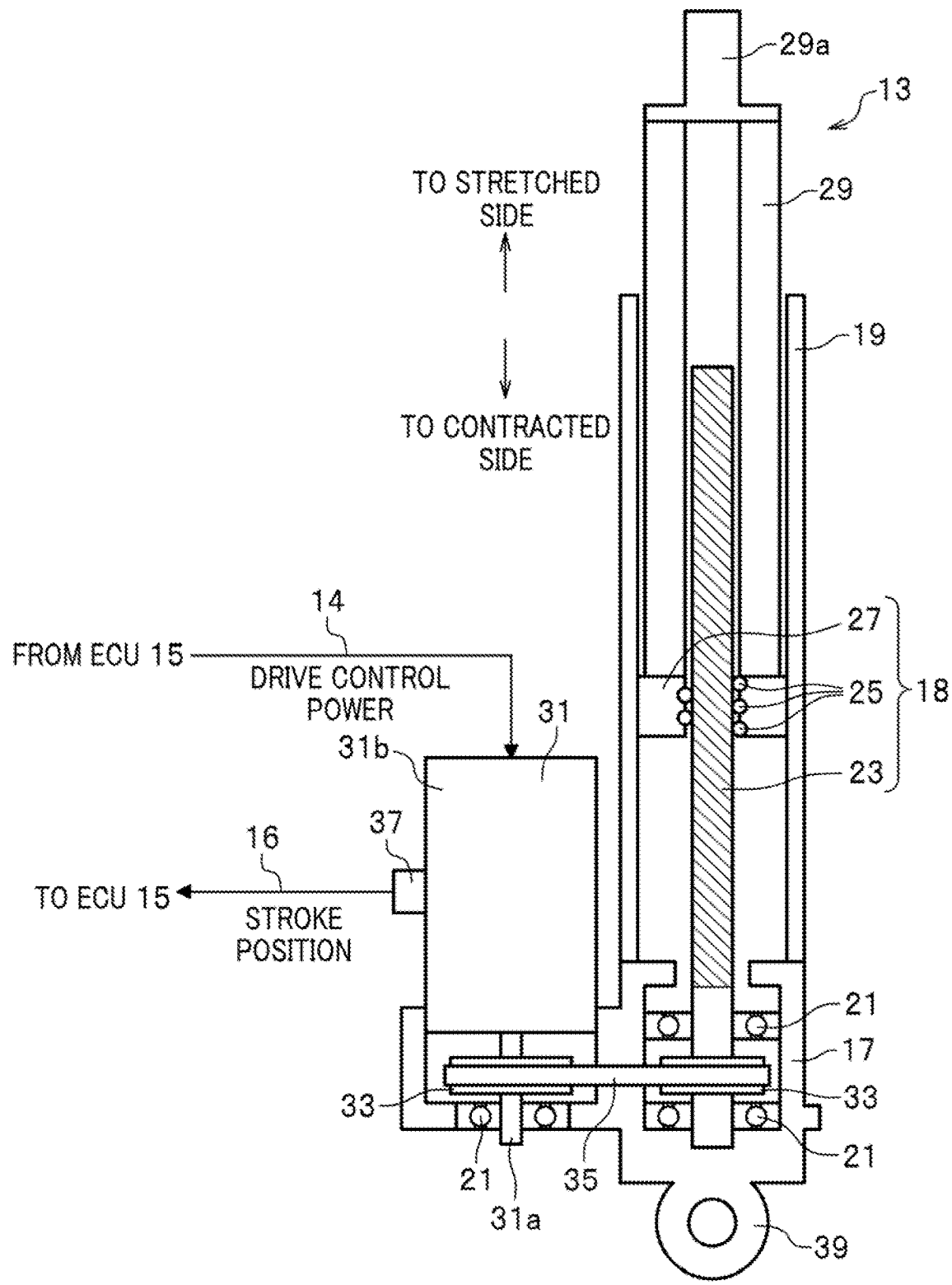
FIG. 2 is a partial cross-sectional diagram of an electromagnetic actuator included in the electrically powered suspension system.

To begin with, referring to FIGS. 1 and 2, descriptions will be provided for the basic configuration common among the electrically powered suspension systems 11 according to the embodiments of the present invention.

FIG. 1 is a diagram of the overall configuration common among the electrically powered suspension systems 11 according to the embodiments of the present invention. FIG. 2 is a partial cross-sectional diagram of an electromagnetic actuator 13 constituting apart of each electrically powered suspension systems 11.

As illustrated in FIG. 1, the electrically powered suspension system 11 according to each embodiment of the present invention includes: multiple electromagnetic actuators 13 provided to the respective wheels of a vehicle 10; and a single electronic control unit (hereinafter referred to as an "ECU") 15. The multiple electromagnetic actuators 13 and the ECU 15 are connected to one another with: electric power supply lines 14 (see solid lines in FIG. 1) which supply drive control power from the ECU 15 to the multiple electromagnetic actuators 13; and signal lines 16 (see broken lines in FIG. 1) which send rotation angle signals of electric motors 31 (see FIG. 2) from the multiple electromagnetic actuators 13 to the ECU 15, respectively.

In the embodiment, four electromagnetic actuators 13 in total are provided to the respective wheels: including front wheels (a left front wheel and a right front wheel); and rear wheels (a left rear wheel and a right rear wheel). Drives of the electromagnetic actuators 13 provided to the wheels are controlled independently of one another in response to the telescopic operations of the wheels, respectively.

In the embodiment of the present invention, the multiple electromagnetic actuators 13 include a common configuration unless otherwise indicated specifically. Descriptions of the multiple electromagnetic actuators 13, therefore, will be provided by describing the configuration of one electromagnetic actuator 13.

As illustrated in FIG. 2, the electromagnetic actuator 13 includes a base housing 17, an outer tube 19, ball bearings 21, a ball screw shaft 23, multiple balls 25, a nut 27 and an inner tube 29.

The base housing 17 supports a base end side of the ball screw shaft 23 with the ball bearings 21 in between in a way that enables the ball screw shaft 23 to rotate about its axis. The outer tube 19 is provided to the base housing 17, and contains a ball screw mechanism 18 including the ball screw shaft 23, the multiple balls 25 and the nut 27. The multiple balls 25 roll along a screw groove in the ball screw shaft 23. The nut 27 engages with the ball screw shaft 23 with the multiple balls 25 in between, and converts the rotational motion to the linear motion of the ball screw shaft 23. The inner tube 29 linked to the nut 27 displaces integrally with the nut 27 in an axial direction of the outer tube 19.

As illustrated in FIG. 2, for the purpose of transmitting a rotary drive force to the ball screw shaft 23, the electromagnetic actuator 13 includes an electric motor 31, a pair of pulleys 33 and a belt member 35. The electric motor 31 is provided to the base housing 17 in parallel to the outer tube 19. The pulleys 33 are respectively attached to a motor shaft 31a of the electric motor 31 and the ball screw shaft 23. The belt member 35 which transmits the rotary drive force of the electric motor 31 to the ball screw shaft 23 is suspended between the pair of pulleys 33.

The electric motor 31 is provided with a resolver 37 which detects the rotation angle signal of the electric motor 31. The rotation angle signal of the electric motor 31 which is detected by the resolver 37 is sent to the ECU 15 through the signal line 16. The rotary drive of the electric motor 31 is controlled in response to the drive control power which the ECU 15 supplies to a corresponding one of the multiple electromagnetic actuators 13 through a corresponding one of the electric power supply lines 14.

It should be noted that in the embodiment, the axial-direction dimension of the of the electromagnetic actuator 13 is made shorter than otherwise by employing a layout in which the motor shaft 31a of the electric motor 31 and the ball screw shaft 23 are linked together by being arranged substantially in parallel with each other, as illustrated in FIG. 2. A layout, however, may be employed in which the motor shaft 31a of the electric motor 31 and the ball screw shaft 23 are linked together by being arranged coaxially.

In the electromagnetic actuator 13 according to the embodiment, a link part 39 is provided to a lower end portion of the base housing 17, as illustrated in FIG. 2. The link part 39 is linked and fixed to a spring lower member (a wheel-side lower arm, knuckle or the like), although not illustrated. Meanwhile, an upper end part 29a of the inner tube 29 is linked and fixed to a sprung member (a vehicle body-side strut tower part or the like), although not illustrated. In short, the electromagnetic actuator 13 is installed in parallel with the spring member provided between the vehicle body and the wheel of the vehicle 10, although not illustrated.

The above-configured electromagnetic actuator 13 works as follows. Let us consider, for example, a case where a thrust related to upward vibration is inputted from the wheel side of the vehicle 10 into the link part 39. In this case, the inner tube 29 and the nut 27 are going to integrally descend relative to the outer tube 19 to which the thrust related to the upward vibration is applied. Thus, the ball screw shaft 23 is going to rotate in a direction corresponding to the descent of the nut 27. At this moment, the electric motor 31 generates the rotary drive force in a direction in which the rotary drive force obstructs the descent of the nut 27. The rotary drive force of the electric motor 31 is transmitted to the ball screw shaft 23 through the belt member 35.

In this way, the reaction force (damping force) against the thrust related to the upward vibration works on the ball screw shaft 23. This damps the damping force which is going to be transmitted from the wheel side to the vehicle body side.

[An Internal Configuration of the ECU 15]

Figure 3:
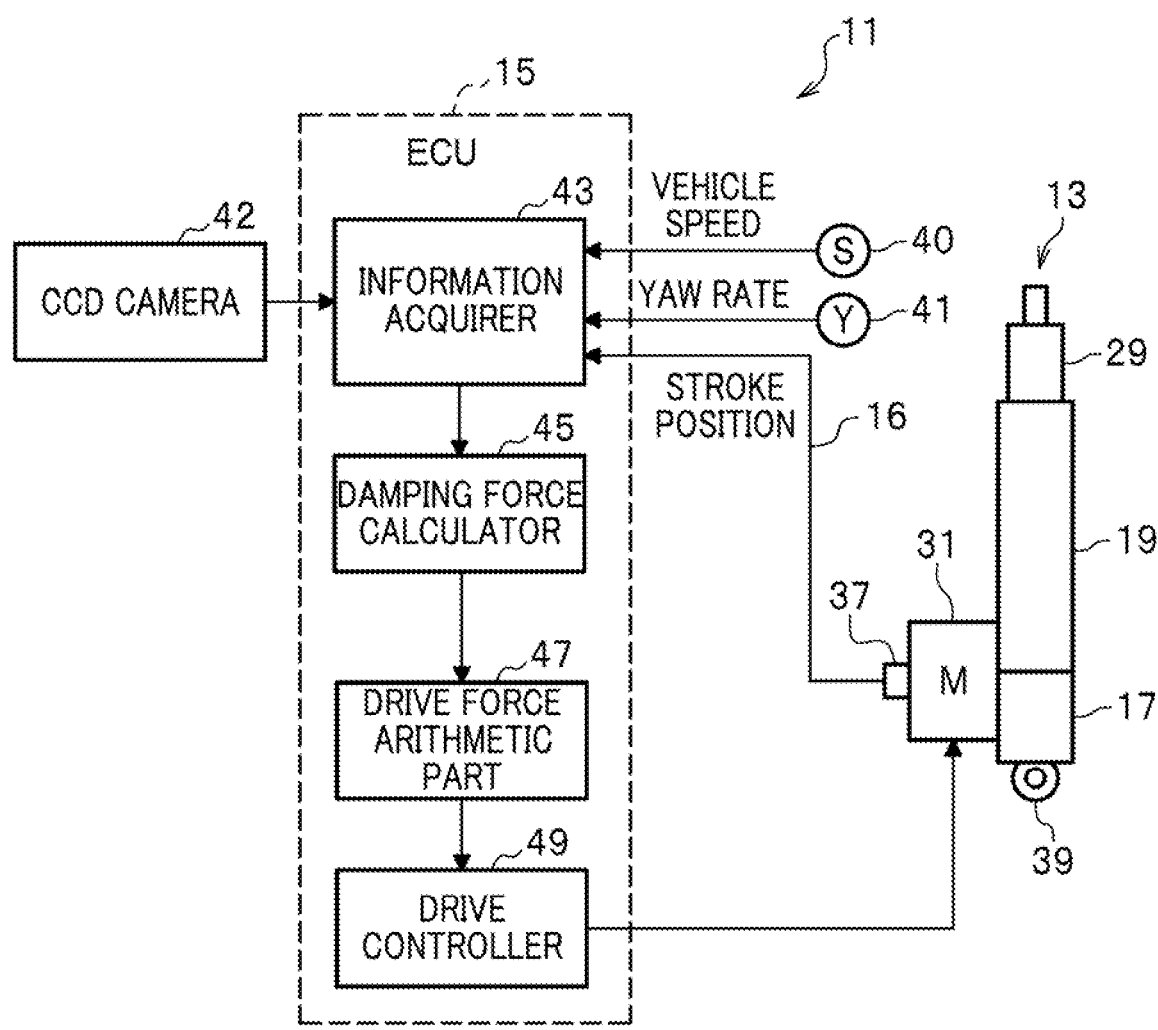
FIG. 3 is a configuration diagram of an interior portion and a peripheral portion of an ECU included in the electrically powered suspension system.

Next, referring to FIG. 3, descriptions will be provided for an interior portion and a peripheral portion of the ECU 15 included in the electrically powered suspension system 11 according to the embodiment of the present invention. FIG. 3 is a configuration diagram of the interior portion and the peripheral portion of the ECU 15 included in the electrically powered suspension system 11 according to the embodiment of the present invention.

The ECU 15 includes a microcomputer which performs various arithmetic processes. The ECU 15 has a drive control function of generating a drive force for damping the vibration of the vehicle body by controlling drives of the multiple electromagnetic actuators 13 based on the rotation angle signals of the electric motors 31 and the like, which are detected by the resolvers 37.

For the purpose of realizing the drive control function, the ECU 15 includes an information acquirer 43, a damping force calculator 45, a drive force arithmetic part 47 and a drive controller 49, as illustrated in FIG. 3.

The information acquirer 43 acquires the rotation angle signal of the electric motor 31, detected by the resolver 37, as time-series information about a stroke position; and differentiating the time-series information about the stroke position with respect to time.

In addition, the information acquirer 43 acquires information about reverse of a stroke direction and information about a stroke amount AS after the reverse, based on the time-series information about the stroke position. Detailed descriptions will be provided for them later.

Moreover, as illustrated in FIG. 3, the information acquirer 43 acquires information about a vehicle speed detected by a vehicle speed sensor 40, information about a yaw rate (a steering amount) detected by a yaw rate sensor 41, and information about a road surface (on which the host vehicle 10 is running) based on an image of the road surface in front of the host vehicle 10 which is acquired by a charge-coupled device (CCD) camera 42 installed on a front side of the host vehicle 10.

The information about the stroke velocity SV, the information about the reverse of the stroke direction, the information about the stroke amount AS after the reverse, the information about the vehicle speed, the information about the yaw rate, and the information about the road surface which are acquired by the information acquirer 43 are sent to the damping force calculator 45.

Based on the information about the stroke velocity SV acquired by the information acquirer 43, the damping force calculator 45 calculates a target damping force serving as a target value of the damping operation of the electromagnetic actuator 13. Furthermore, based on the information about the stroke amount AS after the reverse acquired by the information acquirer 43, the damping force calculator 45 corrects the target damping force basically such that as the stroke amount AS becomes smaller, the target damping force becomes weaker. Detailed descriptions will be provided for the correction of the target damping force later.

A signal representing a corrected target damping force calculated by the damping force calculator 45 is sent to the drive force arithmetic part 47.

Upon receipt of the signal representing the corrected target damping force calculated by the damping force calculator 45, the drive force arithmetic part 47 acquire a drive control signal for realizing the target damping force through an arithmetic operation. The drive control signal as the result of the arithmetic operation performed by the drive force arithmetic part 47 is sent to the drive controller 49.

Based on the drive control signal sent from the drive force arithmetic part 47, the drive controller 49 controls the drives of the multiple electromagnetic actuators 13 independently of one another by supplying the drive control powers to the electric motors provided to the multiple electromagnetic actuators 13, respectively. It should be noted that, for example, an inverter control circuit may be appropriately used to generate drive control power to be supplied to the electric motor 31.

[An Internal Configuration of the ECU 15 Included in the Electrically Powered Suspension System 11]

Figure 4A:
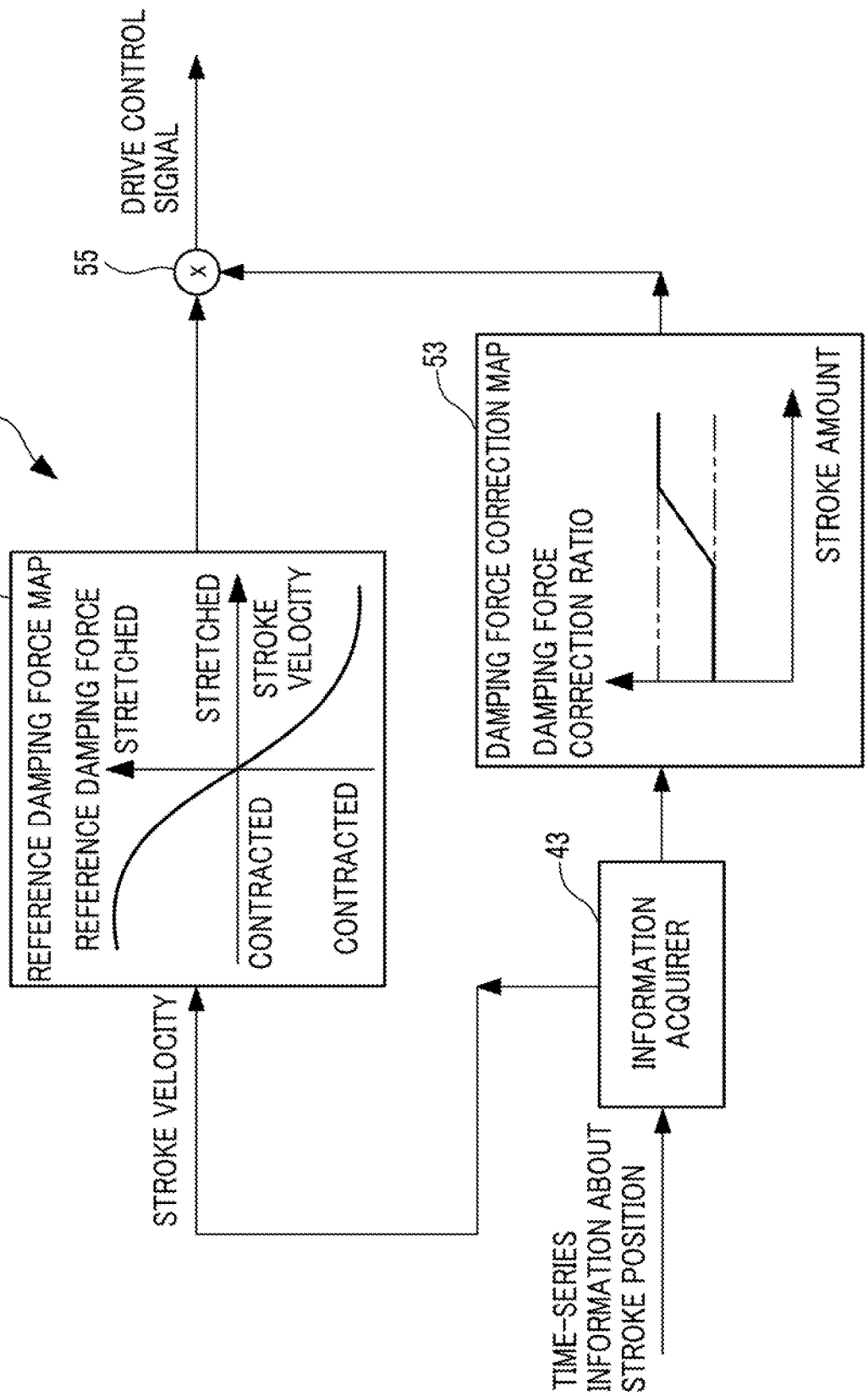
FIG. 4A is a diagram conceptually illustrating an internal portion of the ECU included in the electrically powered suspension system according to the embodiment of the present invention.
Figure 4D:
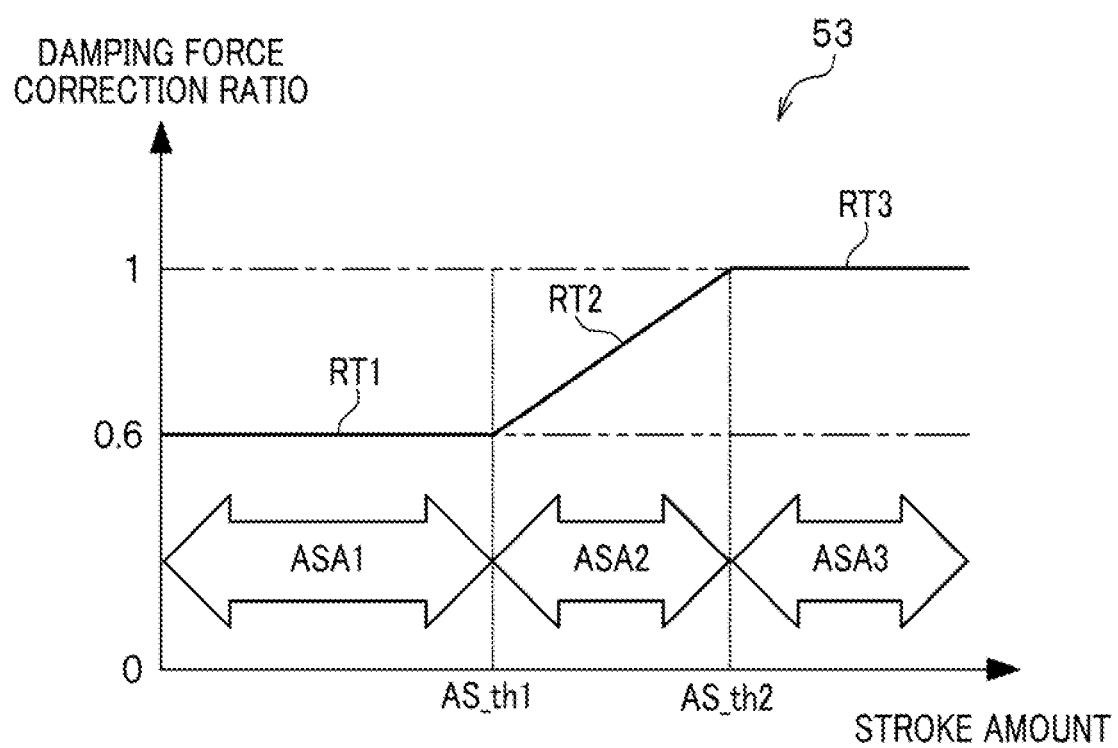
FIG. 4D is an explanatory diagram of a damping force correction map illustrating a relationship between a stroke amount and a corresponding damping force correction ratio.
Figure 5:
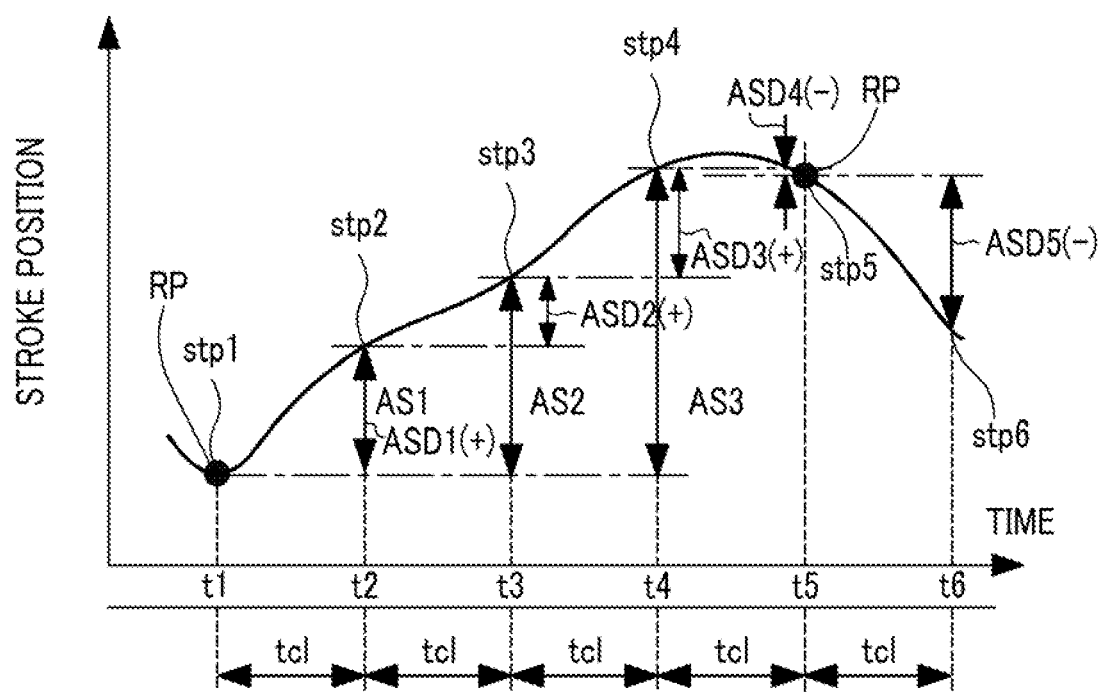
FIG. 5 is a time chart diagram illustrating a change in the stroke amount with time based on a time-series change in a stroke position.

Next, referring to FIGS. 4A to 4D and 5, descriptions will be provided for the internal configuration of the ECU 15 included in the electrically powered suspension system 11 according to the embodiment of the present invention. FIG. 4A is a diagram conceptually illustrating an internal portion of the ECU 15 included in the electrically powered suspension system 11. FIG. 4B is an explanatory diagram of a reference damping force map 51 according to an example, which illustrates a relationship between the stroke velocity SV and a corresponding reference damping force. FIG. 4C is an explanatory diagram of a reference damping force map 52 according to a modification. FIG. 4D is an explanatory diagram of a damping force correction map illustrating a relationship between the stroke amount AS and a corresponding damping force correction ratio RT. FIG. 5 is a time chart diagram illustrating a change in the stroke amount AS with time based on a time-series change in a stroke position.

In the ECU 15 included in the electrically powered suspension system 11 according to the embodiment of the present invention, the information acquirer 43 sends the acquired information about the stroke velocity SV to the reference damping force map 51 according to the example included in the damping force calculator 45, as illustrated in FIG. 4A.

As illustrated in FIGS. 4A and 4B, the reference damping force map 51 according to the example stores values of the reference damping force which change in association with a change in the stroke velocity SV. The value of the reference damping force is actually stored as a value of a reference damping force control current.

The reference damping force is a damping force serving as a reference which is set in advance corresponding to the change in the stroke velocity SV. In the present invention, the reference damping force is corrected based on the stroke amount AS after the reverse of the stroke direction. This makes it possible to acquire a practically large target damping force with the stroke amount AS after the reverse taken into consideration.

As illustrated in FIG. 4B, a change area of the stroke velocity SV in the reference damping force map 51 includes a first area SVA1 and second areas SVA2. The first area SVA1 is a velocity area where the stroke velocity SV is equal to or less than a first velocity threshold SVth1 (|SV-SVth1|=<0). The first velocity threshold SVth1 is a threshold which defines a normal area of the stroke velocity SV.

For this reason, almost all of the stroke velocities SV which occur in a normal running scene fall within the first area SVA1.

Incidentally, an appropriate value may be set as the first velocity threshold SVth1 as long as the value is obtained by referring to a result of evaluating a probability density function of the stroke velocity SV through an experiment, a simulation and the like, and makes an allocation ratio of the stroke velocity SV's appearance in the first area SVA1 to the stroke velocity SV's appearance in the second area SVA2 satisfy a predetermined allocation ratio.

Reference damping force characteristics of the reference damping force map 51 in the first area SVA1 include, as illustrated in FIG. 4B, a characteristic in which: as the stroke velocity SV becomes larger in a direction to the stretched side, the reference damping force in a direction to the contracted side becomes substantially linearly larger; and as the stroke velocity SV becomes larger in a direction to the contracted side, the reference damping force in a direction to the stretched side becomes substantially linearly larger. This characteristic corresponds to a damping characteristic of a conventionally-used hydraulic damper. Incidentally, when the stroke velocity SV is at 0, the corresponding reference damping force is also at 0.

In addition, like the reference damping force characteristics of the reference damping force map 51 in the first area SVA1, reference damping force characteristics of the reference damping force map 51 in the second area SVA2 include, as illustrated in FIG. 4B, a characteristic in which: as the stroke velocity SV becomes larger in the direction to the stretched side, the reference damping force in the direction to the contracted side becomes substantially linearly larger; and as the stroke velocity SV becomes larger in the direction to the contracted side, the reference damping force in the direction to the stretched side becomes substantially linearly larger.

It should be noted that the inclination of the reference damping force characteristics of the reference damping force map 51 in the second area SVA2 is set gentler than the inclination of the reference damping force characteristics of the reference damping force map 51 in the first area SVA1, as illustrated in FIG. 4B.

The reference damping force map 52 (see FIG. 4C) according to the modification may be employed instead of the reference damping force map 51 (see FIG. 4B) according to the example.

In this respect, the reference damping force map 51 according to the example and the reference damping force map 52 according to the modification are common to each other in that the change area of the stroke velocity SV includes the second areas SVA2 provided to the two sides of the first area SVA1 with plus and minus first velocity threshold SVth1 interposed in between, respectively.

However, the reference damping force map 52 according to the modification is different from the reference damping force map 51 according to the example in that third areas SVA3 are respectively provided to the pair of second areas SVA2 with plus and minus high stroke-side ends SVth2 interposed in between.

Like the reference damping force characteristics of the reference damping force map 51 in the first area SVA1, reference damping force characteristics of the reference damping force map 52 in the third area SVA3 include, as illustrated in FIG. 4C, a characteristic in which: as the stroke velocity SV becomes larger in the direction to the stretched side, the reference damping force in the direction to the contracted side becomes substantially linearly larger; and as the stroke velocity SV becomes larger in the direction to the contracted side, the reference damping force in the direction to the stretched side becomes substantially linearly larger.

In addition, the inclination of the reference damping force characteristics of the reference damping force map 52 according to the modification in the third area SVA3 is set substantially equal to the inclination of the reference damping force characteristics of the reference damping force map 51 in the first area SVA1, as illustrated in FIG. 4C.

Referring to the stroke velocity SV acquired by the information acquirer 43 and the contents stored on the reference damping force map 51, the damping force calculator 45 acquires a value of the reference damping force which is suitably large for the stroke velocity SV. The thus-acquired value of the reference damping force is sent to the multiplier 55.

Furthermore, as illustrated in FIG. 4A, the information acquirer 43 acquires the information about the reverse of the stroke direction and the information about the stroke amount AS after the reverse which are based on the time-series information about the stroke position, and sends the acquired information to the damping force correction map 53 included in the damping force calculator 45.

To put it in detail, as illustrated in FIG. 5, the information acquirer 43 sequentially receives the time-series information about the stroke position (signals stp1, stp2, stp3, stp4, stp5, stp6, . . . respectively representing the rotation angles of the electric motor 31) at predetermined cycle times tc1, and sequentially calculates stroke difference amounts ASD representing differences between position data adjacent to each other in time (stp2−stp1=ASD1, stp3−stp2=ASD2, stp4−stp3=ASD3, stp5−stp4=ASD4, stp6−stp5=ASD5, . . . ).

The thus-calculated stroke difference amounts ASD (ASD1, ASD2, ASD3, ASD4, ASD5, . . . ) are all either plus or minus while a stroke in the same direction continues, and change from plus to minus or from minus to plus when the stroke direction is reversed. For this reason, the information acquirer 43 can determine whether a stroke in the same direction continues, by sequentially evaluating whether pairs of stroke difference amounts ASD adjacent to each other in time are all either plus or minus, or change either from plus to minus or from minus to plus.

When the information acquirer 43 determines that no stroke in the same direction continues (pairs of stroke difference amounts ASD adjacent to each other in time change from plus to minus or from minus to plus), the information acquirer 43 considers that "the stroke direction is reversed" when the determination is made, and sets the time RP of the reverse (see a signal stp5 representing the rotational angle of the electric motor 31 illustrated in FIG. 5) as a start point for determining whether the stroke in the same direction continues. In addition, whether plus or minus at the time RP of the reverse ("minus" in the case illustrated in FIG. 5) is used as a reference for evaluating whether pairs of stroke difference amounts ASD adjacent to each other in time are all either plus or minus, or change either from plus to minus or from minus to plus.

On the other hand, when the information acquirer 43 determines that a stroke in the same direction continues (pairs of stroke difference amounts ASD adjacent to each other in time are all either plus or minus), the information acquirer 43 thereafter sequentially acquires the information (AS1, AS2, AS3) about the stroke amounts AS after the reverse by sequentially calculating the stroke amounts AS (stp2−stp1=AS1, stp3−stp1=AS2, stp4−stp1=AS3) after the time RP of the reverse when the stroke is reversed in a period of time (t1 to t4) illustrated in FIG. 5.

As illustrated in FIG. 4A, the information acquirer 43 sends the acquired information about the reverse of the stroke direction and the acquired information (AS1, AS2, AS3) about the stroke amounts AS after the reverse to the damping force correction map 53 included in the damping force calculator 45.

As illustrated in FIGS. 4A and 4D, the damping force correction map 53 stores values of the damping force correction ratio RT which change in association with the change in the stroke amount AS. The damping force correction ratio RT is a coefficient to be used to correct the reference damping force based on how large the corresponding stroke amount AS after the reverse is. The damping force correction ratio RT is not specifically limited, but for example, a value in a range of 0.5 to 1.5 is employed as the damping force correction ratio RT depending on the necessity. In the following explanation, the "damping force correction ratio RT" will be referred to as a "correction ratio RT" in some cases.

The damping force correction ratio RT is prepared for both the stretched-side stroke and the contracted-side stroke. In this case, characteristics of the damping force correction ratio RT may be set common to, or different between, the stretched-side stroke and the contracted-side stroke.

In this respect, referring to FIG. 4D, descriptions will be provided for the characteristics of the damping force correction ratio RT stored on the damping force correction map 53.

As illustrated in FIG. 4D, in a first stroke amount area ASA1 where the stroke amount AS is equal to or less than a predetermined first stroke amount threshold ASth1, the value of a damping force correction ratio RT1 is set at a fixed value (a value less than 1, for example, 0.6).

In addition, in a second stroke amount area ASA2 where the stroke amount AS is greater than the first stroke amount threshold ASth1 but equal to or less than a second stroke amount threshold ASth2, the value of a damping force correction ratio RT2 is set at a variable value (for example, not less than 0.6 but not greater than 1) which becomes linearly larger as the stroke amount AS becomes larger.

Moreover, in a third stroke amount area ASA3 where the stroke amount AS is greater than the second stroke amount threshold ASth2, the value of a damping force correction ratio RT3 is set at a fixed value (a value equal to or greater than 1, for example, 1).

Incidentally, the first stroke amount threshold ASth1 and the second stroke amount threshold ASth2 may be respectively set at appropriate values through an experiment or a simulation by giving a consideration to an appropriate balance between the request for an improvement in the ride quality and the request for an improvement in the driving stability.

In the case where the stroke amount AS is greater than the second stroke amount threshold ASth2, the value of the damping force correction ratio RT3 is set at the fixed value (the value equal to or greater than 1, for example, 1) for the following reason.

The case where the stroke amount AS is greater than the second stroke amount threshold ASth2 is assumed as a case where the request for an improvement in the driving stability is apparently greater than the request for an improvement in the ride quality (for example, during an off-road driving). In such a case, the satisfaction of the request for an improvement in the driving stability is prioritized over the satisfaction of the request for an improvement in the ride quality.

Against this background, in the third stroke amount area ASA3 where the stroke amount AS is greater than the second stroke amount threshold ASth2, the value of the damping force correction ratio RT3 is set at the fixed value (the value equal to or greater than 1, for example, 1). Thereby, regardless of the change in the stroke amount AS, the value of the target damping force is kept as it is without becoming smaller than the reference damping force.

Nevertheless, correction may be performed such that regardless of the change in the stroke amount AS, the value of the target damping force uniformly becomes larger than the reference damping force by setting the value of the damping force correction ratio RT3 at a fixed value (the value greater than 1, for example, 1.1).

Meanwhile, in the second stroke amount area ASA2 where the stroke amount AS is greater than the first stroke amount threshold ASth1 but equal to or less than the second stroke amount threshold ASth2, the value of the damping force correction ratio RT2 is set such that the value thereof becomes linearly smaller as the stroke amount AS becomes smaller, for the following reason.

The case where the stroke amount AS is greater than the first stroke amount threshold ASth1 but equal to or less than the second stroke amount threshold ASth2 is assumed as a case where the request for an improvement in the driving stability is in a transition period toward being greater than the request for an improvement in the ride quality (for example, during driving on a paved road with a coarse surface). In such a case, it is convenient if the level of the satisfaction of the request for an improvement in the driving stability and the level of the satisfaction of the request for an improvement in the ride quality can be appropriately adjusted corresponding to how large the stroke amount AS is.

Against this background, in the second stroke amount area ASA2 where the stroke amount AS is greater than the first stroke amount threshold ASth1 but equal to or less than the second stroke amount threshold ASth2, the value of the damping force correction ratio RT2 is set such that the value thereof becomes linearly larger as the stroke amount AS becomes larger, in other words, such that the value thereof becomes linearly smaller as the stroke amount AS becomes smaller. Correction is performed to appropriately adjust the value of the target damping force relative to the reference damping force, corresponding to how large the stroke mount AS is.

This makes it possible to satisfy the request for an improvement in the driving stability and the request for an improvement in the ride quality at the same time at a higher level corresponding to the motion condition of the vehicle which changes with time.

In the first stroke amount area ASA1 where the stroke amount AS is equal to or less than the first stroke amount threshold ASth1, the value of the damping force correction ratio RT1 is set at the fixed value (the value less than 1, for example, 0.6) for the following reason.

The case where the stroke amount AS is equal to or less than the first stroke amount threshold ASth1 is assumed as a case where the request for an improvement in the ride quality is greater than the request for an improvement in the driving stability (for example, during driving on a road in a good condition).

Almost all of the roads in Japan are in a condition because of their maintenance. In the case of driving on a road with a good condition, the satisfaction of the request for an improvement in the ride quality is prioritized over the satisfaction of the request for an improvement in the driving stability.

Against this background, in the first stroke amount area ASA1 where the stroke amount AS is equal to or less than the first stroke amount threshold ASth1, correction is performed such that regardless of the change in the stroke amount AS, the value of the target damping force uniformly becomes lower than the reference damping force by setting the value of the damping force correction ratio RT1 at the fixed value (the value less than 1, for example, 0.6).

This improves the ride quality by eliminating unnecessary damping force. Secondarily, a request for energy saving can be also satisfied.

In short, the damping force calculator 45 acquires the value of the damping force correction ratio RT which is suitably large for the stroke amount AS, by referring to the information about the reverse of the stroke direction and the information about the stroke amount AS after the reverse which are acquired by the information acquirer 43, as well as the contents stored on the damping force correction map 53. The thus-acquired value of the damping force correction ratio RT is sent to the multiplier 55.

The multiplier 55 in the damping force calculator 45 multiples the value of the reference damping force large corresponding to the stroke velocity SV, which is calculated by the damping force calculator 45, by the value of the damping force correction ratio RT. Thereby, the value of the reference damping force is corrected to become equal to a value suitably large for the stroke amount AS after the reverse which changes with time. Accordingly, a practically large target damping force can be obtained by giving a consideration to how large the stroke amount AS after the reverse is.

[How the Electrically Powered Suspension Systems 11 According to the Embodiments of the Present Invention Works]

Figure 6:
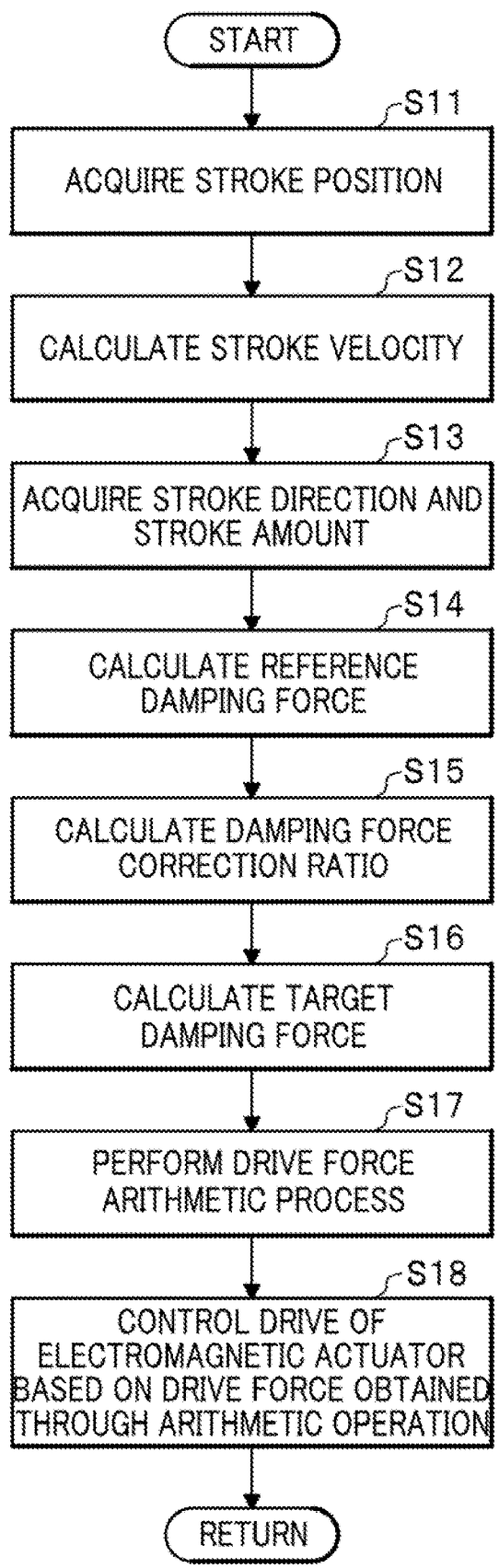
FIG. 6 is a flowchart to be used to explain how the electrically powered suspension system according to the embodiment of the present invention works.

Next, referring to FIG. 6, descriptions will be provided for how the electrically powered suspension system 11 according to each embodiment of the present invention works. FIG. 6 is a flowchart diagram used to explain how the electrically powered suspension system 11 according to the embodiment of the present invention works.

In step S11 (a stroke position acquiring step) illustrated in FIG. 6, the information acquirer 43 of the ECU 15 acquires the rotation angle signal of the electric motor 31, detected by the resolver 37, as the time-series information about the stroke position.

In step S12 (a stroke velocity calculating step), the information acquirer 43 in the ECU 15 calculates the stroke velocity SV by differentiating the time-series information about the stroke position acquired by in step S11 with respect to time. The information about the thus-calculated stroke velocity SV is sent to the damping force calculator 45.

In step S13 (a stroke direction and stroke amount acquiring step), the ECU15 sequentially receives the time-series information about the stroke position (the signals representing the rotation angles of the electric motor 31) acquired by in step S11 at the predetermined time cycles tc1, and calculates the stroke difference amounts ASD which are differences between pairs of position data adjacent to each other in time. In addition, based on whether the stroke difference amounts ASD as the result of the calculation are plus or minus, the ECU 15 acquires the stroke direction, and time information about the reverse of the stroke direction.

Subsequently, the ECU 15 acquires the information about the stroke amount AS after the reverse which starts to be measured at the time RP of the reverse when the stroke is reversed.

In step S14 (a reference damping force calculating step), the damping force calculator 45 in the ECU 15 acquires the value of the reference damping force which is large enough to correspond to the stroke velocity SV, by referring to the stroke velocity SV calculated (acquired) in step S12 and the contents stored on the reference damping force map 51.

In step S15 (a damping force correction ratio calculating step), the damping force calculator 45 in the ECU 15 acquires the damping force correction ratio RT suitably large for the stroke amount AS, by referring to the information about the reverse of the stroke direction and the information about the stroke amount AS after the reverse acquired by in step S11, as well as the contents stored on the damping force correction map 53.

In step S16 (a target damping force calculating step), the damping force calculator 45 in the ECU 15 calculates the corrected target damping force by multiplying the value of the reference damping force calculated in step S14 by the value of the damping force correction ratio RT calculated in step S15 (where $0.6 =< RT =< 1$ in the case of the embodiment).

In step S17 (a drive force arithmetic process step), the drive force arithmetic part 47 in the ECU 15 acquires the drive control signal for realizing the corrected target damping force calculated in step S16 through the arithmetic operation.

In step S18, the drive controller 49 of the ECU 15 controls the drives of the multiple electromagnetic actuators 13 by supplying the drive control powers to the electric motors 31 provided to the electromagnetic actuators 13 based on the drive control signals acquired through the arithmetic process in step S17, respectively.

[An Internal Configuration of an ECU 15 Included in an Electrically Powered Suspension System 11 According to a Modification of the Embodiment of the Present Invention]

Figure 7:
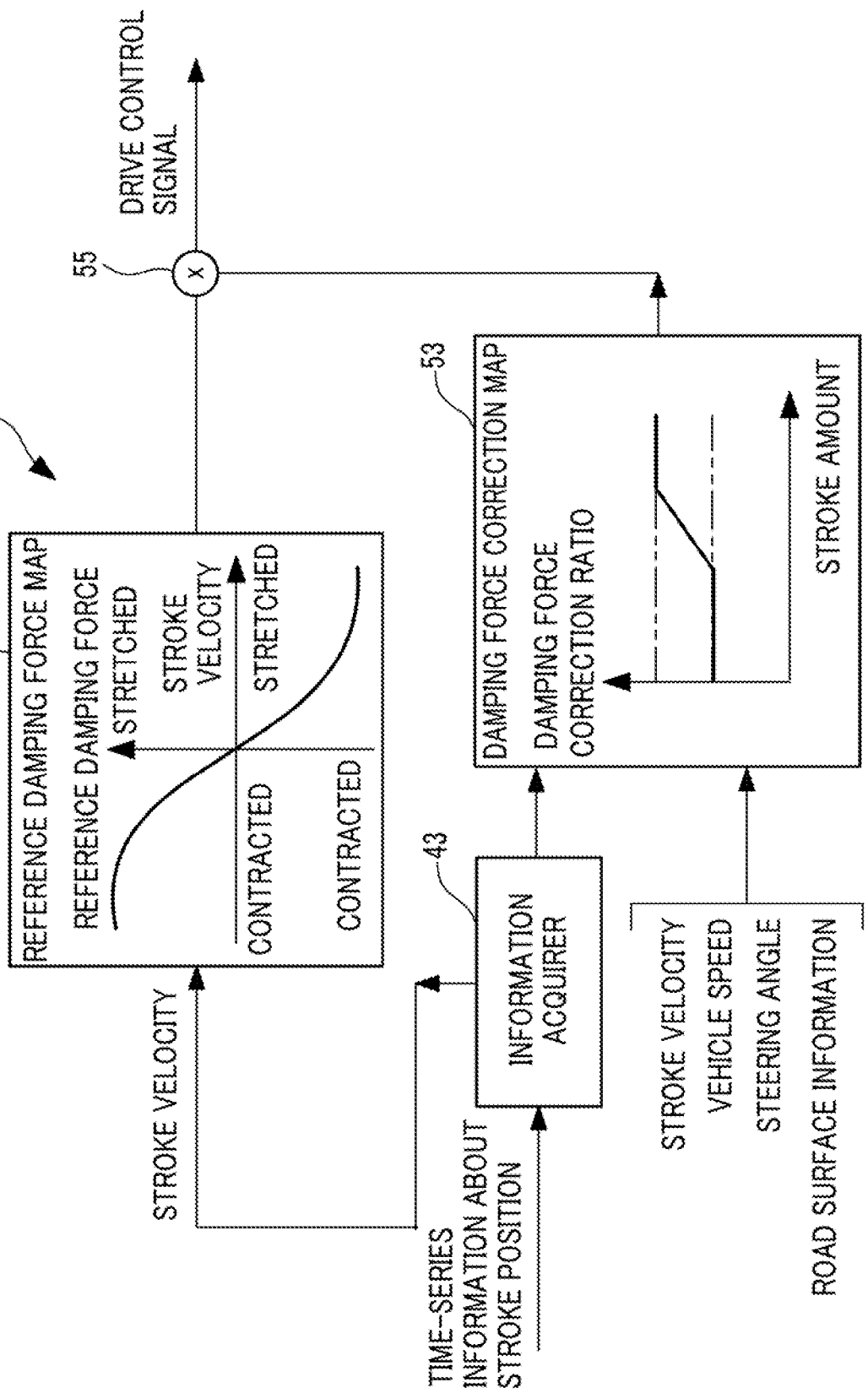
FIG. 7 is a diagram conceptually illustrating an internal portion of an ECU included in an electrically powered suspension system according to the modification of the embodiment of the present invention.

Next, referring to FIG. 7, descriptions will be provided for the internal configuration of the ECU 15 included in the electrically powered suspension system 11 according to the modification of the embodiment of the present invention. FIG. 7 is a diagram conceptually illustrating the interior portion of the ECU 15 included in the electrically powered suspension system 11 according to the modification of the embodiment of the present invention.

The configuration of the electrically powered suspension system 11 according to the embodiment of the present invention which is illustrated in FIG. 4A and the configuration of the electrically powered suspension system 11 according to the modification of the embodiment of the present invention which is illustrated in FIG. 7 are common in many parts.

The configuration of the electrically powered suspension system 11 according to the modification of the embodiment of the present invention, therefore, will be described by explaining mainly what makes the electrically powered suspension system 11 according to the modification of the embodiment of the present invention different from the electrically powered suspension system 11 according to the embodiment of the present invention.

The electrically powered suspension system 11 according to the modification of the embodiment of the present invention is different from the electrically powered suspension system 11 according to the embodiment of the present invention in that the stroke velocity SV acquired by the information acquirer 43, the vehicle speed detected by the vehicle speed sensor 40, the yaw rate (the steering amount) detected by the yaw rate sensor 41 and the road surface information are inputted into the damping force correction map 53 included in the damping force calculator 45.

The stroke velocity SV, the vehicle speed, the yaw rate (the steering amount) and the road surface information are referred to when the characteristics of the damping force correction ratio RT which is set in association with the change n the stroke amount AS are corrected. Detailed descriptions will be provided for this.

[Working and Effects of the Electrically Powered Suspension System 11 According to the Embodiments (Including the Modifications) of the Present Invention]

The electrically powered suspension system 11 based on a first aspect includes: the electromagnetic actuator 13 which is provided between the vehicle body and the wheel of the vehicle 10, and which generates the drive force for damping the vibration of the vehicle 10; the information acquirer 43 which acquires the time-series information about the stroke position of, and the information about the stroke velocity SV of, the electromagnetic actuator 13, as well as the information about the reverse of the stroke direction and the information about the stroke amount AS after the reverse, based on the time-series information about the stroke position; the damping force calculator 45 which calculates the target damping force serving as the target value of the damping operation of the electromagnetic actuator 13 based on the information about the stroke velocity SV acquired by the information acquirer 43; and the drive controller 49 which controls the drive of the electromagnetic actuator 13 using the target drive force based on the target damping force calculated by the damping force calculator 45.

The damping force calculator 45 corrects the target damping force based on the information about the stroke amount AS after the reverse acquired by the information acquirer 43.

The reason why the electrically powered suspension system 11 based on the first aspect corrects the target damping force based on the information about the stroke amount AS after the reverse is as follows.

The inventors got an idea of using the information about the stroke amount AS of the electromagnetic actuator 13 which changes with time in order to appropriately correct the target damping force corresponding to the motion condition of the vehicle which changes with time.

However, a problem with this idea was how a start point of measuring the stroke amount AS should be set in order to use the information about the stoke amount AS as a parameter for correcting the target damping force.

In a case where a neutral position between the stretched side and contracted side of the electromagnetic actuator 13 is set as the origin (start point) and the distance from the origin (start point to the stroke position is defined as the stroke amount AS, the arithmetic process was too complicated to identify the origin (start point) representing the neutral position and to calculate the stroke amount AS. This made it difficult to secure the timeliness of the process.

Against this background, the inventors got an idea of: employing the time RP (see FIG. 5) when the stroke of the electromagnetic actuator 13 is reversed, as the start point of measuring the stroke amount AS; and correcting the target damping force based on the information about the stroke amount AS after the reverse.

The inventors have since earnestly carried out the study based on the idea, and completed the present invention which is capable of fulfilling the vibration isolation performance of the sprung members and the grounding performance of the unsprung members at the same time at a higher level corresponding to the motion condition of the vehicle 10 which change with time, by correcting the target damping force based on the information about the stroke amount AS after the reverse which well reflects the motion condition of the vehicle 10 which change with time.

In short, in the electrically powered suspension system 11 based on the first aspect, the damping force calculator 45 corrects the target damping force based on the information about the stroke amount after the reverse which is acquired by the information acquirer 43.

The electrically powered suspension system 11 based on the first aspect corrects the target damping force based on the information about the stroke amount AS after the reverse, and is therefore capable of fulfilling the vibration isolation performance of the sprung members and the grounding performance of the unsprung members at the same time at a higher level corresponding to the motion condition of the vehicle 10 which change with time.

Meanwhile, like the electrically powered suspension system 11 based on the first aspect, the electrically powered suspension system 11 based on a second aspect includes the electromagnetic actuator 13, the information acquirer 43, the damping force calculator 45 and the drive controller 49.

The damping force calculator 45 corrects the target damping force based on the information about the stroke amount AS after the reverse acquired by the information acquirer 43, such that as the stroke amount AS becomes smaller, the target damping force becomes weaker.

The electrically powered suspension system 11 based on the second aspect corrects the target damping force based on the information about the stroke amount AS after the reverse, such that as the stroke amount AS becomes smaller, the target damping force becomes weaker. Thus, like the electrically powered suspension system 11 based on the first aspect, the electrically powered suspension system 11 based on the second aspect is capable of fulfilling the vibration isolation performance of the sprung members and the grounding performance of the unsprung members at the same time at a higher level corresponding to the motion condition of the vehicle 10 which changes with time.

Meanwhile, the electrically powered suspension system 11 based on a third aspect is the electrically powered suspension system 11 based on the first or second aspect, in which the damping force calculator 45 calculates the target damping force by: calculating the reference damping force serving as the reference of the electromagnetic actuator 13 based on the information about the stroke velocity SV acquired by the information acquirer 43; calculating the correction ratio RT for correcting the reference damping force based on the information about the stroke amount AS after the reverse acquired by the information acquirer 43; and multiplying the calculated reference damping force by the correction ratio RT.

In the electrically powered suspension system 11 based on the third aspect, the damping force calculator 45 calculates the target damping force by multiplying the calculated reference damping force by the correction ratio RT, that is to say, by correcting the reference damping force in terms of the stroke amount AS after the reverse. The electrically powered suspension system 11 based on the third aspect is therefore capable of clarifying the procedure for calculating the target damping force based on the stroke amount AS after the reverse, in addition to the working and effects of the electrically powered suspension system 11 based on the second aspect.

Furthermore, the electrically powered suspension system 11 based on a fourth aspect is the electrically powered suspension system 11 based on the third aspect, and may employ a configuration in which the damping force calculator 45 performs a correction to adjust the value of the correction ratio RT based on the information about the stroke velocity SV acquired by the information acquirer 43. The electrically powered suspension system 11 based on the fourth aspect corresponds to the electrically powered suspension system 11 (see FIG. 7) according to a modification of the embodiment of the present invention.

Figure 8A:
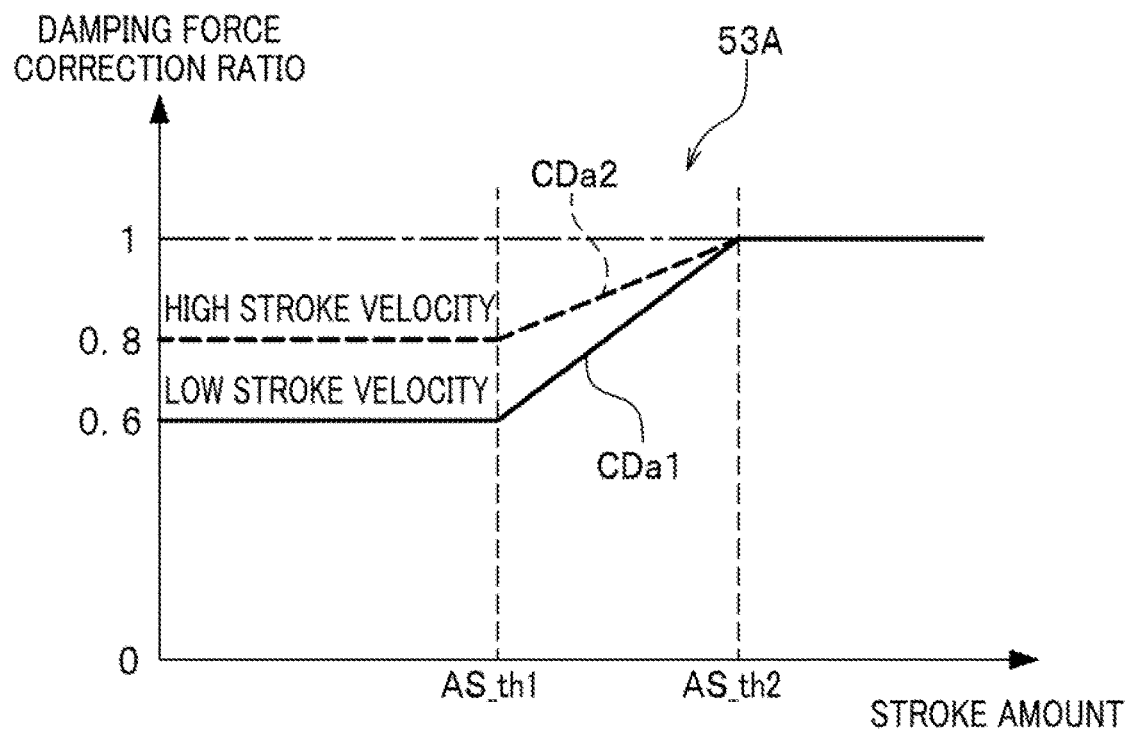
FIG. 8A is an explanatory diagram of a damping force correction map according to a modification, which is referred to when correction is performed to adjust a value of the damping force correction ratio based on how high or low the stroke velocity is.

Referring to FIG. 8A, descriptions will be provided for how the electrically powered suspension system 11 based on the fourth aspect works. FIG. 8A is an explanatory diagram of a damping force correction map 53A according to the modification, which is referred to when the correction is performed to adjust the value of the correction ratio RT based on how high or low the stroke velocity SV is.

In the electrically powered suspension system 11 based on the fourth aspect, the damping force calculator 45 performs the correction to adjust the value of the correction ratio RT based on the information about the stroke velocity SV, for example, such that the value of the correction ratio RT decreases (where RT=0.6 in the example illustrated in FIG. 8A) in a case where the stroke velocity SV is low (see a characteristic line diagram CDa1 indicated with a solid line in FIG. 8A). In this respect, the case where the stroke velocity SV is low may be assumed, for example, as a case where no large vibration is being inputted into the electromagnetic actuator 13 (during running on a road in a good condition).

Meanwhile, the damping force calculator 45 performs the correction to adjust the value of the correction ratio RT based on the information about the stroke velocity SV, for example, such that the value of the correction ratio RT increases (where RT=0.8 in the example illustrated in FIG. 8A) in a case where the stroke velocity SV is high (see a characteristic line diagram CDa2 indicated with a dotted line in FIG. 8A). In this respect, the case where the stroke velocity SV is high may be assumed, for example, as a case where large vibration is being inputted into the electromagnetic actuator 13 (during running on a road in a bad condition).

The electrically powered suspension system 11 based on the fourth aspect, for example, decreases the target damping force by adjusting the value of the correction ratio RT such that the value of the correction ratio RT decreases in the case of running on a road in a good condition, and increases the target damping force by adjusting the value of the correction ratio RT such that the value of the correction ratio RT increases in the case of running on a road in a bad condition. The electrically powered suspension system 11 based on the fourth aspect, therefore, appropriately adjusts the allocation of emphasis between the grounding performance of the unsprung members and the vibration isolation performance of the sprung members corresponding to how high or low the stroke velocity SV is, in addition to the working and effects of the electrically powered suspension system 11 based on the third aspect. The electrically powered suspension system 11 based on the fourth aspect is accordingly capable of realizing the effect of securing the driving stability of the vehicle 10 and the effect of enhancing the ride quality of the vehicle 10 by appropriately adjusting their effect strength in response to how high or low the stroke velocity SV is.

Furthermore, a secondary effect of satisfying the request for energy saving can be expected from the electrically powered suspension system 11 based on the fourth aspect since the electrically powered suspension system 11 decreases the target damping force by adjusting the value of the correction ratio RT such that the value of the correction ratio RT becomes lower in the case of running on a road in a good condition.

Besides, the electrically powered suspension system 11 based on a fifth aspect is the electrically powered suspension system 11 based on the third or fourth aspect, and may employ a configuration in which: the information acquirer 43 acquires the information about the vehicle speed; and the damping force calculator 45 performs the correction to adjust the value of the correction ratio RT based on the information about the vehicle speed acquired by the information acquirer 43. The electrically powered suspension system 11 based on the fifth aspect corresponds to the electrically powered suspension system 11 (see FIG. 7) according to a modification of the embodiment of the present invention.

Figure 8B:
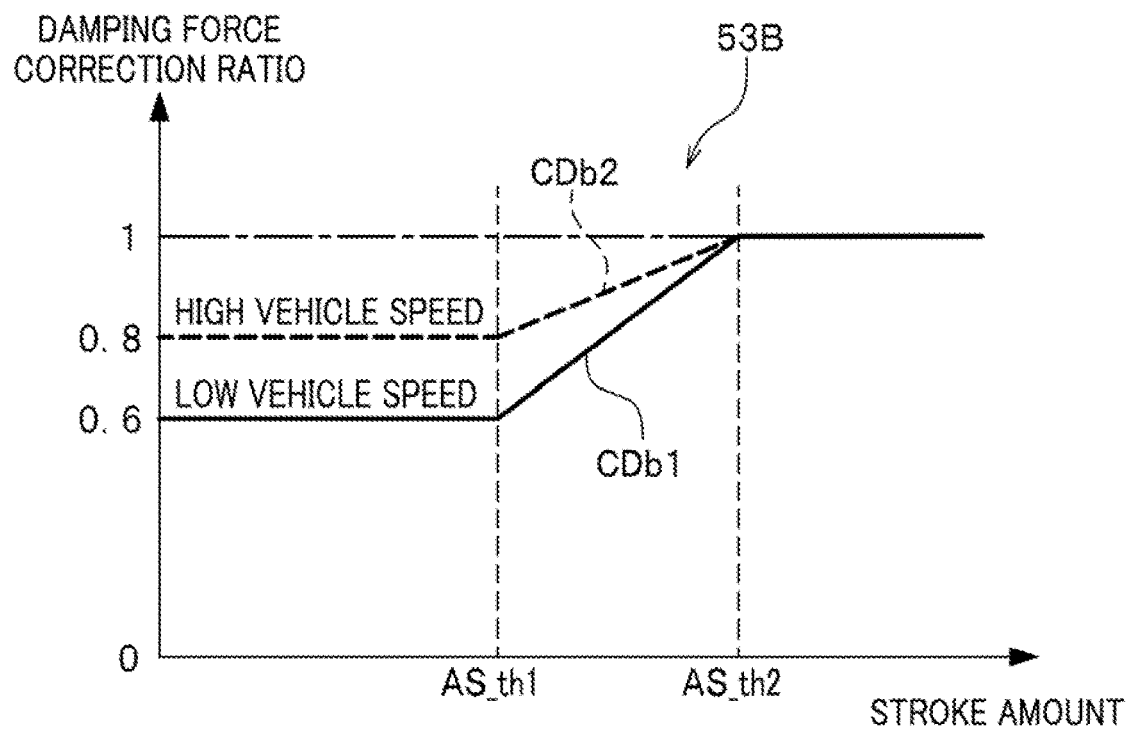
FIG. 8B is an explanatory diagram of a damping force correction map according to a modification, which is referred to when a correction is performed to adjust the value of the damping force correction ratio based on how high or low a vehicle speed is.

Referring to FIG. 8B, descriptions will be provided for how the electrically powered suspension system 11 based on the fifth aspect works. FIG. 8B is an explanatory diagram of a damping force correction map 53B according to the modification, which is referred to when the correction is performed to adjust the value of the correction ratio RT based on how high or low a vehicle speed is.

In the electrically powered suspension system 11 based on the fifth aspect, the damping force calculator 45 performs the correction to adjust the value of the correction ratio RT based on the information about the vehicle speed, for example, such that the value of the correction ratio RT decreases (where RT=0.6 in the example illustrated in FIG. 8B) in a case where the vehicle speed is low (see a characteristic line diagram CDb1 indicated with a solid line in FIG. 8B). In this respect, the request to prioritize the ride quality of the vehicle 10 over the driving stability of the vehicle 10 becomes higher in a driving scene where the vehicle speed is low than otherwise.

Meanwhile, the damping force calculator 45 performs the correction to adjust the value of the correction ratio RT based on the information about the vehicle speed, for example, such that the value of the correction ratio RT increases (where RT=0.8 in the example illustrated in FIG. 8B) in a case where the vehicle speed is high (see a characteristic line diagram CDb2 indicated with a dotted line in FIG. 8B). In this respect, the request to prioritize the driving stability of the vehicle 10 over the ride quality of the vehicle 10 becomes higher in a driving scene where the vehicle speed is high than otherwise.

The electrically powered suspension system 11 based on the fifth aspect appropriately increases or decreases the target damping force by performing the adjustment to increase or decrease the value of the correction ratio RT corresponding to how high or low the vehicle speed is. The electrically powered suspension system 11 based on the fifth aspect, therefore, appropriately adjusts the allocation of emphasis between the grounding performance of the unsprung members and the vibration isolation performance of the sprung members corresponding to how high or low the vehicle speed is. The electrically powered suspension system 11 based on the fifth aspect is accordingly capable of realizing the effect of securing the driving stability of the vehicle 10 and the effect of enhancing the ride quality of the vehicle 10 by appropriately adjusting their effect strength in response to how high or low the vehicle speed is.

Furthermore, the secondary effect of satisfying the request for energy saving can be expected from the electrically powered suspension system 11 based on the fifth aspect since the electrically powered suspension system 11 decreases the target damping force by adjusting the value of the correction ratio RT such that the value of the correction ratio RT decreases in the case where the vehicle speed is low.

Meanwhile, the electrically powered suspension system 11 based on a sixth aspect is the electrically powered suspension system 11 based on any one of the third to fifth aspects, and may employ a configuration in which: the information acquirer 43 acquires information about the steering; and the damping force calculator 45 performs the correction to adjust the value of the correction ratio RT based on the steering amount based on the information about the steering acquired by the information acquirer 43, for example, such that as the steering amount becomes smaller, the value of the correction ratio RT decreases.

In this respect, the information about the steering includes a steering angle, a steering angular velocity, a steering torque and a yaw rate. Meanwhile, the steering amount based on the information about the steering means the steering amount obtained based on the information about the steering.

The electrically powered suspension system 11 based on the sixth aspect corresponds to the electrically powered suspension system 11 (see FIG. 7) according to a modification of the embodiment of the present invention.

Figure 8C:
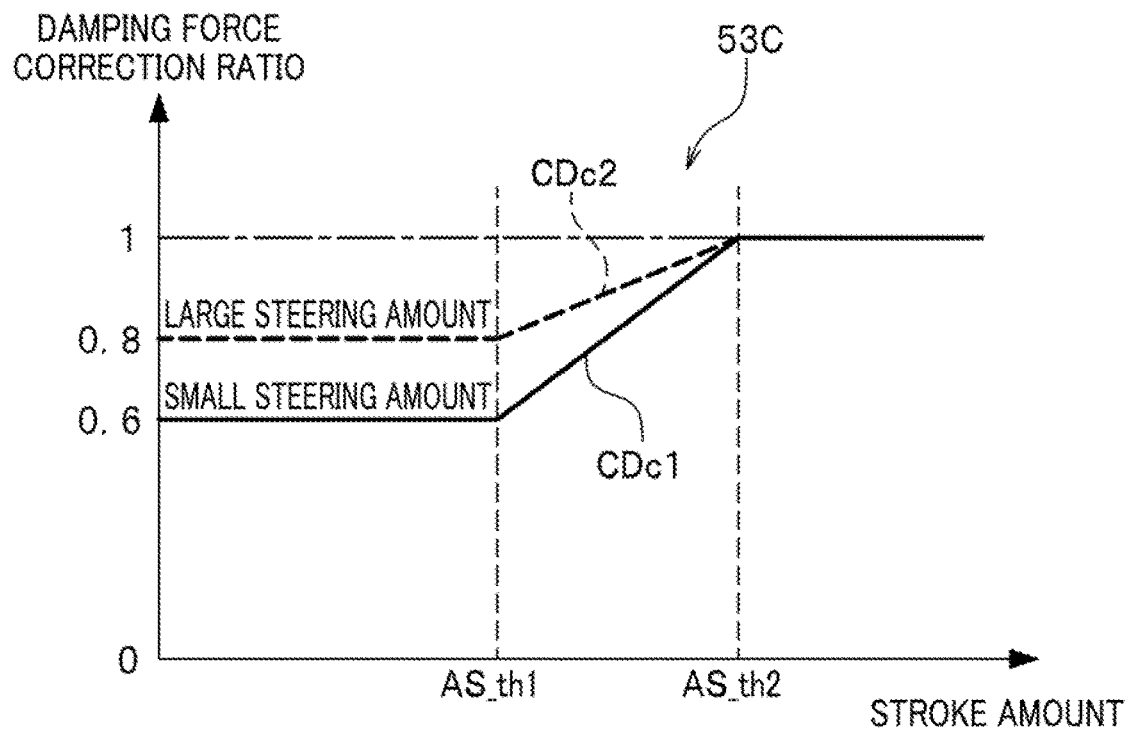
FIG. 8C is an explanatory diagram of a damping force correction map according to a modification, which is referred to when a correction is performed to adjust the value of the damping force correction ratio based on how large or small a steering amount is.

Referring to FIG. 8C, descriptions will be provided for how the electrically powered suspension system 11 based on the sixth aspect works. FIG. 8C is an explanatory diagram of a damping force correction map 53C according to the modification, which is referred to when the correction is performed to adjust the value of the correction ratio RT based on how large or small the steering amount is.

In the electrically powered suspension system 11 based on the sixth aspect, the information acquirer 43 acquires the information about the steering; and the damping force calculator 45 performs the correction to adjust the value of the correction ratio RT based on the steering amount based on the information about the steering acquired by the information acquirer 43, such that the value of the correction ratio RT decreases (where RT=0.6 in the example illustrated in FIG. 8C) in a case where the steering amount is small (see a characteristic line diagram CDc1 indicated with a solid line in FIG. 8C). In this respect, a request to prioritize the ride quality of the vehicle 10 over the driving stability of the vehicle 10 becomes higher in a driving scene where the steering amount is small (including a scene where the vehicle 10 is running on a straight lane) than otherwise.

Furthermore, the damping force calculator 45 performs the correction to adjust the value of the correction ratio RT based on the steering amount based on the information about the steering acquired by the information acquirer 43, such that the value of the correction ratio RT increases (where RT=0.8 in the example illustrated in FIG. 8C) in a case where the steering amount is large (see a characteristic line diagram CDc2 indicated with a dotted line in FIG. 8C). In this respect, a request to prioritize the driving stability of the vehicle 10 over the ride quality of the vehicle 10 becomes higher in a driving scene where the steering amount is large (such as a scene where the vehicle 10 is running on a winding road) than otherwise.

The electrically powered suspension system 11 based on the sixth aspect appropriately increases or decreases the target damping force by performing the adjustment to increase or decrease the value of the correction ratio RT corresponding on how large or small the steering amount is. The electrically powered suspension system 11 based on the sixth aspect, therefore, appropriately adjusts the allocation of emphasis between the grounding performance of the unsprung members and the vibration isolation performance of the sprung members corresponding to how high or low the steering amount is. The electrically powered suspension system 11 based on the sixth aspect is accordingly capable of realizing the effect of securing the driving stability of the vehicle 10 and the effect of enhancing the ride quality of the vehicle 10 by appropriately adjusting their effect strength in response to how high or low the steering amount is.

Furthermore, in the driving scene where the steering amount is small, the effect of enhancing the ride quality of the vehicle 10 can be expected from the electrically powered suspension system 11 based on the sixth aspect since the electrically powered suspension system 11 based on the sixth aspect decreases the target damping force by decreasing the value of the correction ratio RT, and accordingly improves the vibration isolation performance of the sprung members over the grounding performance of the unsprung members. In addition, a secondary effect of satisfying the request for energy saving can be expected from the electrically powered suspension system 11 based on the sixth aspect.

Meanwhile, the electrically powered suspension system 11 based on a seventh aspect is the electrically powered suspension system 11 based on any one of the third to sixth aspects, and may employ a configuration in which: the information acquirer 43 acquires road surface information about a road surface on which the host vehicle is running; and the damping force calculator 45 performs the correction to adjust the value of the correction ratio RT based on the road surface information about the road surface on which the host vehicle is running, which is acquired by the information acquirer 43, for example, such that the value of the correction ratio RT decreases as the road surface condition becomes better.

The electrically powered suspension system 11 based on the seventh aspect corresponds to the electrically powered suspension system 11 (see FIG. 7) according to a modification of the embodiment of the present invention.

Figure 8D:
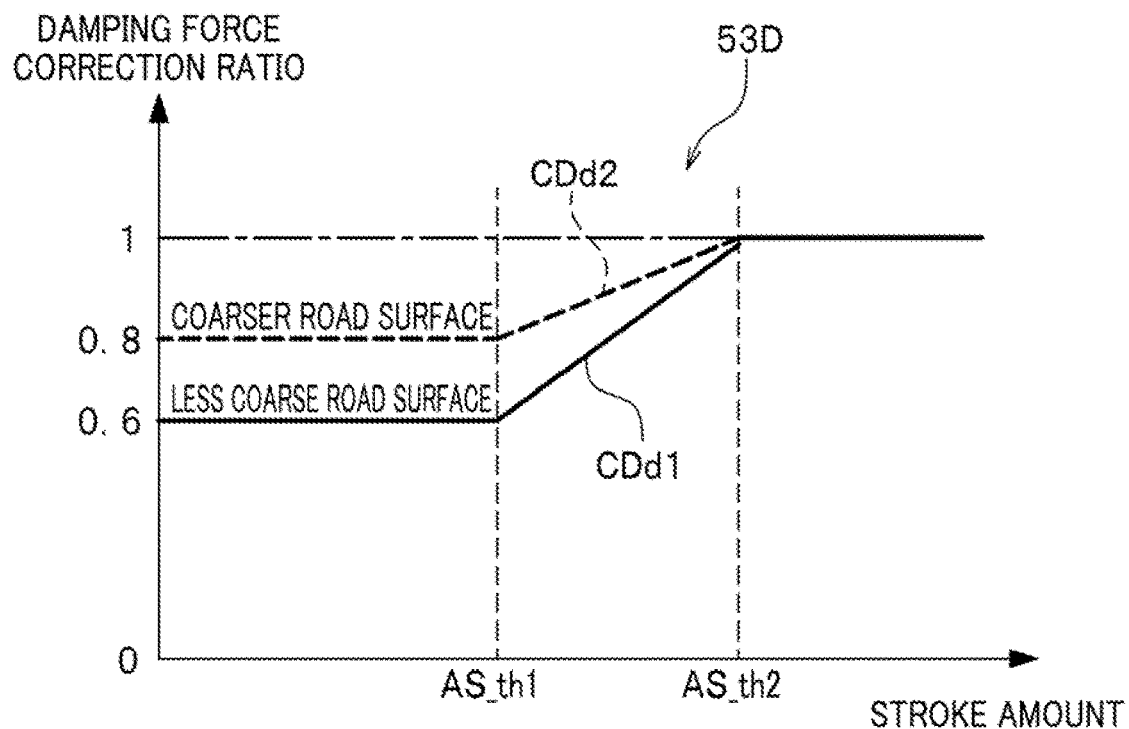
FIG. 8D is an explanatory diagram of a damping force correction map according to a modification, which is referred to when a correction is performed to adjust the value of the damping force correction ratio based on how coarse a road surface is.

Referring to FIG. 8D, descriptions will be provided for how the electrically powered suspension system 11 based on the seventh aspect works. FIG. 8D is an explanatory diagram of a damping force correction map 53D according to the modification, which is referred to when the correction is performed to adjust the value of the correction ratio RT based on how coarse the road surface is.

In the electrically powered suspension system 11 based on the seventh aspect, the information acquirer 43 acquires the road surface information about the road surface on which the host vehicle is running; and the damping force calculator 45 performs the correction to adjust the value of the correction ratio RT based on the road surface information about the road surface on which the host vehicle is running, which is acquired by the information acquirer 43, for example, such that the value of the correction ratio RT decreases (where RT=0.6 in the example illustrated in FIG. 8D) as the road surface condition becomes better (as the road surface becomes less coarse).

In this respect, in a scene where the vehicle 10 is running on a road with a good road surface condition (the road surface is less coarse, see a characteristic line diagram CDd1 indicated with a solid line in FIG. 8D), a request to prioritize the ride quality of the vehicle 10 over the driving stability of the vehicle 10 becomes higher than otherwise. On the other hand, in a scene where the road surface condition is bad (the road surface is coarser, see a characteristic line diagram CDd2 indicated with a dotted line in FIG. 8D), a request to prioritize the driving stability of the vehicle 10 over the ride quality of the vehicle 10 becomes higher than otherwise.

The electrically powered suspension system 11 based on the seventh aspect appropriately increases or decreases the target damping force by performing the adjustment to increase or decrease the value of the correction ratio RT corresponding to how good or bad the road surface condition is. The electrically powered suspension system 11 based on the seventh aspect, therefore, appropriately adjusts the allocation of emphasis between the grounding performance of the unsprung members and the vibration isolation performance of the sprung members corresponding to how good or bad the road surface condition is. The electrically powered suspension system 11 based on the seventh aspect is accordingly capable of realizing the effect of securing the driving stability of the vehicle 10 and the effect of enhancing the ride quality of the vehicle 10 by appropriately adjusting their effect strength in response to how good or bad the road surface condition is.

Furthermore, in the scene where the vehicle 10 is running on a road with a good road surface condition, the effect of enhancing the ride quality of the vehicle 10 can be expected from the electrically powered suspension system 11 based on the seventh aspect since the electrically powered suspension system 11 based on the seventh aspect decreases the target damping force by decreasing the value of the correction ratio RT, and accordingly improves the vibration isolation performance of the sprung members over the grounding performance of the unsprung members. In addition, a secondary effect of satisfying the request for energy saving can be expected from the electrically powered suspension system 11 based on the sixth aspect.

OTHER EMBODIMENTS

The multiple embodiments discussed above are examples of how the present invention is embodied. These shall not be used to limitedly construe the technical scope of the present invention. This is because the present invention can be carried out in various modes without departing from the gist or main features of the present invention.

For example, the electrically powered suspension system 11 according to the modification of the embodiment of the present invention has been described giving an example where the characteristics of the damping force correction ration RT are appropriately corrected based on one of the stroke velocity SV, the vehicle speed, the yaw rate (steering amount) and the road surface information. However, the present invention is not limited to this example.

A configuration may be employed in which the characteristics of the damping force correction ration RT are corrected based on a combination of multiple of the stroke velocity SV, the vehicle speed, the yaw rate (steering amount) and the road surface information.

Moreover, the electrically powered suspension systems 11 according to the embodiments of the present invention have been described using an example where the four electromagnetic actuators 13 in total are arranged respectively in both the front wheels (the left front wheel and the right front wheel) and the rear wheels (the left rear wheel and the right rear wheel). However, the present invention is not limited to this example. The present invention may employ a configuration in which a total of two electromagnetic actuators 13 are arranged in either the front wheels or the rear wheels.

Finally, the electrically powered suspension systems 11 according to the embodiments of the present invention have been described referring to the drive controller 49 which controls the drives of the multiple electromagnetic actuators 13 independently of one another.

Specifically, the drive controller 49 may control the drives of the electromagnetic actuators 13 provided to the four wheels in a way that makes the controls in the respective wheels independent of one another.

Otherwise, the drive controller 49 may control the drives of the electromagnetic actuators 13 provided to the four wheels in a way that makes the controls in the front wheels and the controls in the rear wheels independent of each other, or in a way that makes the controls in the left wheels and the controls in the right wheels independent of each other.

What is claimed is:

1. An electrically powered suspension system comprising:
   an electromagnetic actuator which is provided between a vehicle body and a wheel of a vehicle, and which generates a drive force for damping vibration of the vehicle;
   an information acquirer which acquires time-series information about a stroke position of, and information about a stroke velocity of, the electromagnetic actuator, as well as information about reverse of a stroke direction and information about a stroke amount after the reverse, based on the time-series information about the stroke position;
   a damping force calculator which calculates a target damping force serving as a target value of the damping operation of the electromagnetic actuator based on the information about the stroke velocity acquired by the information acquirer; and
   a drive controller which controls drive of the electromagnetic actuator using a target drive force based on the target damping force calculated by the damping force calculator, wherein
   the damping force calculator corrects the target damping force based on the information about the stroke amount after the reverse acquired by the information acquirer.

2. An electrically powered suspension system comprising:
   an electromagnetic actuator which is provided between a vehicle body and a wheel of a vehicle, and which generates a drive force for damping vibration of the vehicle;
   an information acquirer which acquires time-series information about a stroke position of, and information about a stroke velocity of, the electromagnetic actuator, as well as information about reverse of a stroke direction and information about a stroke amount after the reverse, based on the time-series information about the stroke position;
   a damping force calculator which calculates a target damping force serving as a target value of the damping operation of the electromagnetic actuator based on the information about the stroke velocity acquired by the information acquirer; and
   a drive controller which controls drive of the electromagnetic actuator using a target drive force based on the target damping force calculated by the damping force calculator, wherein
   the damping force calculator corrects the target damping force based on the information about the stroke amount after the reverse acquired by the information acquirer, such that as the stroke amount becomes smaller, the target damping force becomes weaker.

3. The electrically powered suspension system according to claim 1, wherein
the damping force calculator calculates the target damping force by: calculating a reference damping force serving as a reference of the electromagnetic actuator based on the information about the stroke velocity acquired by the information acquirer; calculating a correction ratio for correcting the reference damping force based on the information about the stroke amount after the reverse acquired by the information acquirer; and multiplying the calculated reference damping force by the correction ratio.

4. The electrically powered suspension system according to claim 3, wherein
the damping force calculator performs a correction to adjust a value of the correction ratio based on the information about the stroke velocity acquired by the information acquirer.

5. The electrically powered suspension system according to claim 3, wherein
the information acquirer acquires information about a vehicle speed, and
the damping force calculator performs the correction to adjust the value of the correction ratio based on the information about the vehicle speed acquired by the information acquirer.

6. The electrically powered suspension system according to claim 3, wherein
the information acquirer acquires information about steering, and
the drive controller performs the correction to adjust the value of the correction ratio based on a steering amount based on the information about the steering acquired by the information acquirer.

7. The electrically powered suspension system according to claim 3, wherein
the information acquirer acquires road surface information about a road surface on which a host vehicle is running, and
the drive controller performs the correction to adjust the value of the correction ratio based on the road surface information about the host vehicle acquired by the information acquirer.

* * * * *

UNITED STATES PATENT AND TRADEMARK OFFICE
CERTIFICATE OF CORRECTION

| | | |
|---|---|---|
| PATENT NO. | : 11,376,915 B2 | |
| APPLICATION NO. | : 16/830477 | |
| DATED | : July 5, 2022 | |
| INVENTOR(S) | : Satoshi Ohno et al. | |

It is certified that error appears in the above-identified patent and that said Letters Patent is hereby corrected as shown below:

On the Title Page

Item (30) Add --Mar. 27, 2019 (JP).................... JP2019-061140--.

Signed and Sealed this
Twenty-ninth Day of November, 2022

*Katherine Kelly Vidal*

Katherine Kelly Vidal
*Director of the United States Patent and Trademark Office*